United States Patent [19]

Riccitelli

[11] Patent Number: 5,580,184
[45] Date of Patent: Dec. 3, 1996

[54] ANGULAR ADJUSTABLE CLAMP YOKE

[75] Inventor: Martin G. Riccitelli, Westfield, Mass.

[73] Assignee: The Torrington Company, Torrington, Conn.

[21] Appl. No.: 431,216

[22] Filed: Apr. 28, 1995

[51] Int. Cl.⁶ .................................................. F16B 7/04
[52] U.S. Cl. ........................... 403/365; 403/373; 403/362; 403/290; 74/492; 74/493; 74/617; 280/779
[58] Field of Search .................................. 403/373, 374, 403/79, 157, 309, 310, 312, 313, 289, 290, 362, 365, 366, 367, 371; 74/490, 492, 493, 617, 552; 464/160; 250/779

[56] References Cited

U.S. PATENT DOCUMENTS

| | | | |
|---|---|---|---|
| 2,466,097 | 4/1949 | Graue . | |
| 2,723,140 | 11/1955 | Graham | 403/290 |
| 2,761,300 | 9/1956 | Gredell . | |
| 3,463,520 | 8/1969 | Turro | 403/362 |
| 3,598,432 | 8/1971 | Walker | 403/366 |
| 3,740,085 | 6/1973 | Evans | 403/366 X |
| 3,923,409 | 12/1975 | Stoner | 403/290 |
| 4,899,611 | 2/1990 | Pinna | 74/492 |
| 4,938,094 | 7/1990 | Cochard | 74/552 |
| 5,052,842 | 10/1991 | Janatka | 403/290 X |
| 5,144,861 | 9/1992 | Nishijima et al. | 74/552 |
| 5,358,350 | 10/1994 | Oertle | 403/290 X |
| 5,366,316 | 11/1994 | Cymbal | 403/359 X |

FOREIGN PATENT DOCUMENTS

| | | | |
|---|---|---|---|
| 3433635 | 3/1986 | Germany | 74/492 |
| 3610775 | 10/1987 | Germany | 74/492 |
| 809940 | 3/1959 | United Kingdom | 403/313 |
| 2265202 | 9/1993 | United Kingdom | 403/310 |

*Primary Examiner*—Harry C. Kim
*Attorney, Agent, or Firm*—Michael H. Minns

[57] ABSTRACT

A clamp yoke having an angular adjustable insert. The angular adjustable insert has a profiled bore which is complementary to the profile of a shaft. The adjustability of the insert allows the insert to be rotated slightly during installation to account for tolerances in both the clamp yoke and the device the clamp yoke is being installed into. Preferably, the insert is axially restrained within the clamp yoke to prevent the insert from falling out of the clamp yoke prior to installation.

11 Claims, 4 Drawing Sheets

ANGULAR ADJUSTABLE CLAMP YOKE

BACKGROUND OF THE INVENTION

This invention relates generally to shaft connecting devices and more particularly to steering shaft clamp yokes.

Typically clamp yokes for steering shafts comprise a solid one piece member having a profiled bore for accepting a complementarily profiled shaft, a bolt for axially restraining the shaft and yoke ears for connection to other steering shaft components such as a universal joint. In a typical clamp yoke an axially extending slot is provided to allow the yoke to be tightened against the profiled shaft. The complementary profiles of the yoke bore and the shaft prevent the shaft from rotating relative to the clamp yoke once the shaft and clamp yoke are assembled.

For a typical clamp yoke and shaft assembly, the angular relationship between the clamp yoke and shaft is fixed once the shaft and clamp yoke have been manufactured. Frequently, due to interference problems in an automobile or due to manufacturing tolerances of the components in a steering column, some angular adjustment of the shaft relative to the clamp yoke is needed, but typical clamp yokes are not angularly adjustable.

A common manufacturing method for yokes is to cold form the basic yoke shape from an aluminum slug, including a circular bore. The bore is then broached to form a profiled shape complementary to the shaft profile. If a different profile shape is needed or the angular position of the profiled shape is changed, the broaching operation must be changed.

The foregoing illustrates limitations known to exist in present shaft connecting devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a connection comprising: a first member, the first member having a first bore therein; an insert member inserted into the first bore, the insert member being angularly adjustable relative to the first member, the insert member having a second bore therein; a second member inserted into the second bore; a means for securing the insert member to the first member; and a means for axially restraining the second member relative to the first member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
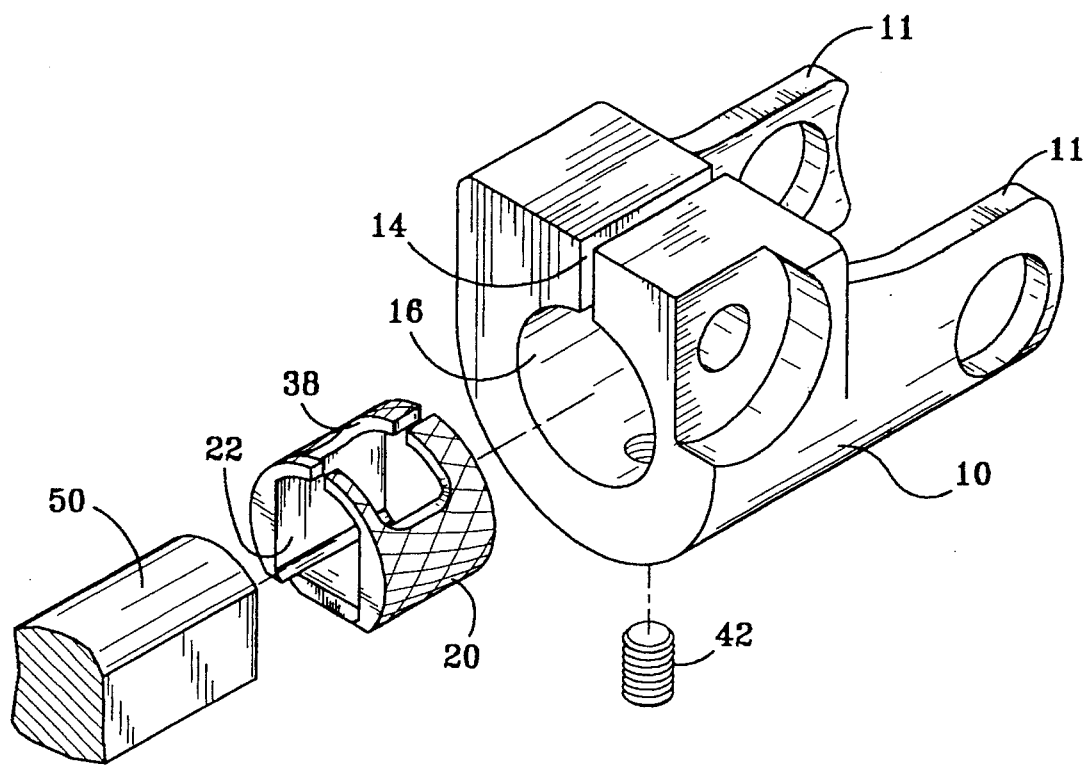
FIG. 1 is an exploded perspective of a clamp yoke incorporating an angular adjustable insert.
Figure 2:
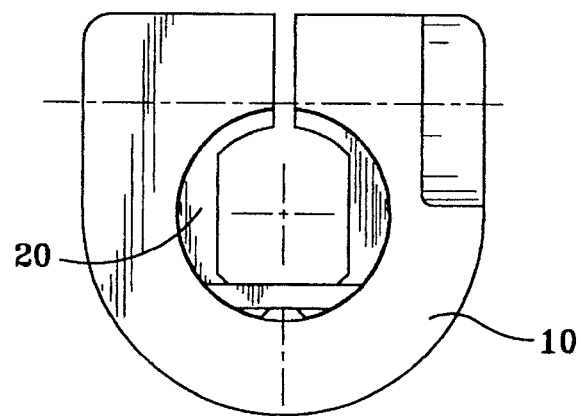
FIG. 2 is an end view of the clamp yoke shown in FIG. 1.
Figure 9:
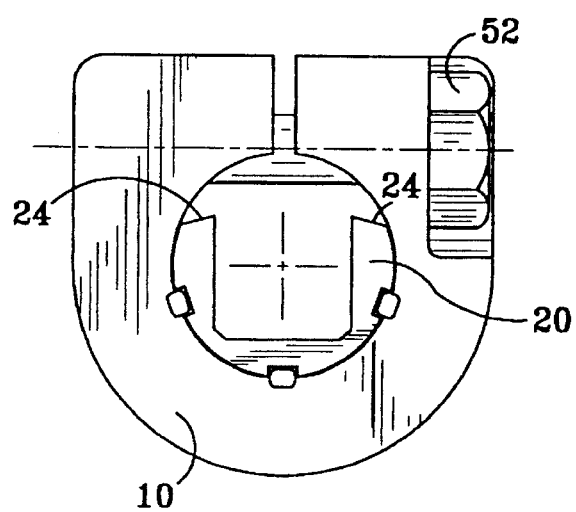
FIG. 9 is an end view of a clamp yoke incorporating a further embodiment of the angular adjustable insert.

FIG. 1 shows a perspective view of a clamp yoke for connecting portions of a steering system. Typically, a shaft 50 having a profiled exterior shape is inserted into an annular insert 20 which is secured to the yoke member 10. Preferably, the annular insert has a circular outer surface and a profiled interior bore 22. The interior bore 22 of the insert 20 has a shape complementary to the exterior shape of the shaft 50, thereby permitting the transmission of torque from the shaft 50 to the insert 20. The yoke member 10 includes a pair of longitudinally extending spaced apart ears 11. The yoke member 10 has an axially extending circular bore 16, an axially extending slot 14 and a bolt hole 12 for receiving a securing bolt 52 (shown in FIG. 9).

Figure 8:
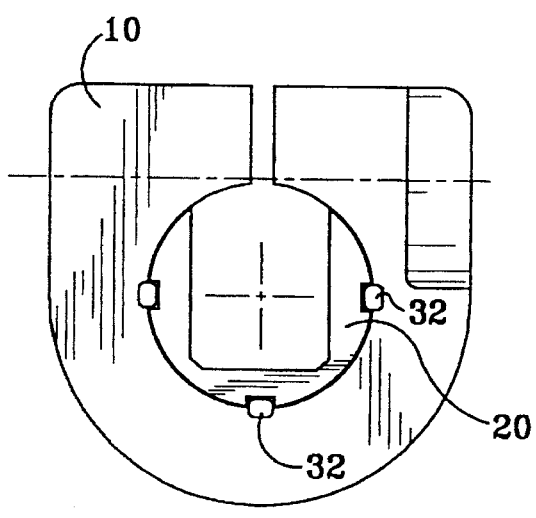
FIG. 8 is an end view of a clamp yoke with the angular adjustable insert shown in FIG. 7.

The circular shapes of the insert 20 and the yoke bore 16 allow the insert 20 to rotate relative to the yoke member 10. A securing means is provided to secure the insert 20 to the yoke member 10. Preferably, the securing means limits the angular movement of the insert 20 relative to the yoke member 10. This securing means can be a plurality of stakes 32, as shown in FIG. 8, a set screw 42 engaging the insert 20, as shown in FIG. 6, welding or brazing the insert 20 to the yoke member 10, a roll pin or bolt inserted through yoke bolt hole 12 engaging a transverse relieved area 38 formed in insert 20, shown in FIG. 1, or by a pin or bolt extending through holes provided in the yoke member 10, insert 20 and shaft 50 (not shown).

As an alternative to one of the securing means described above to limit angular movement of the insert 20 relative to the yoke member 10, the insert 20 can have an outer profiled shape and the yoke member bore 16 will have a similar, but not completely complementary profile. This difference in the profiles is to permit a limited angular movement of the insert 20 relative to the yoke member 10. For this embodiment, a securing means is needed to provide only axial retention of the insert 20 in the yoke member 10.

One of the advantages of the yoke member 10 with an angular adjustable insert 20 is the ability to accommodate a variety of shaft 50 profiles with a single version of the basic yoke member 10. A plurality of inserts 20 can be provided with different interior profiles or orientations, as shown in FIGS. 1, 5, 7 and 9. The inserts 20 are preferably formed from powdered metal. However, other common manufacturing techniques can be used to manufacture the inserts 20 including injection molding. Another advantage of the yoke member 10 with an angular adjustable insert 20 is the ability to accommodate angular mismatch between the profiled shaft 50 and the clamp yoke (yoke member 10 and insert 20) during installation in an automobile. Preferably, the insert 20 is axially secured in the yoke member 10, but can move angularly relative to the yoke member 10. During installing of the clamp yoke in a steering system, as the shaft 50 is inserted into the insert 20, the insert 20 is rotated until the profiled interior bore 22 is aligned with the matching profile on the shaft 50. This will accommodate any angular misalignment of the shaft 50 and the clamp yoke. The insert 20 and shaft 50 are then secured to the yoke member 10 to prevent further angular movement of the insert 20 and to secure shaft 50 to the yoke member 10 and insert 20.

Figure 3:
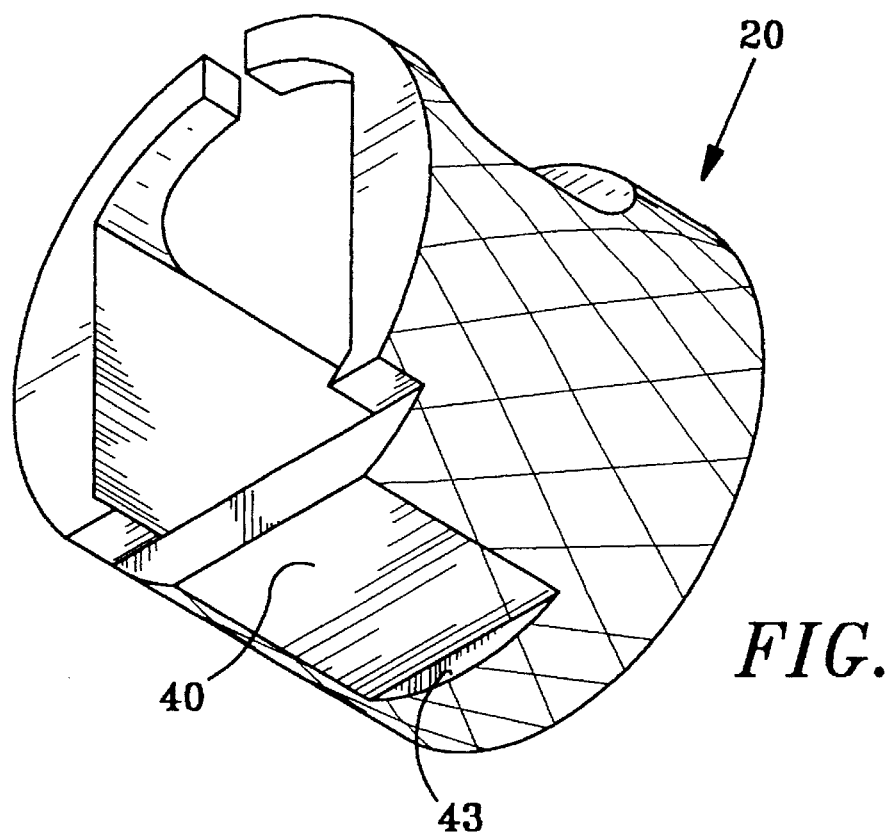
FIG. 3 is a perspective view of one embodiment of the angular adjustable insert.
Figure 4:
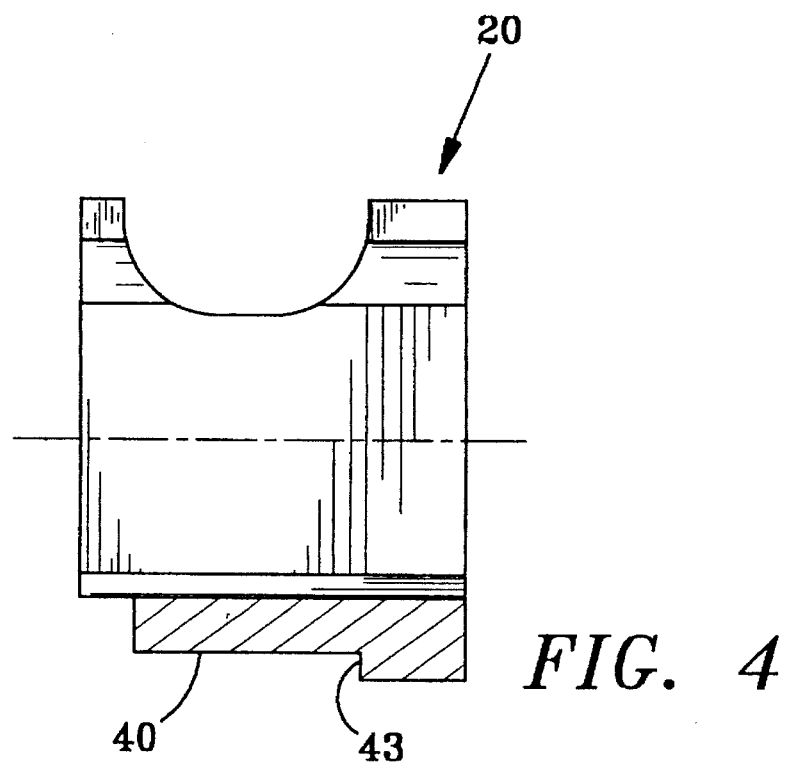
FIG. 4 is a cross-section of the angular adjustable insert shown in FIG. 3.
Figure 6:
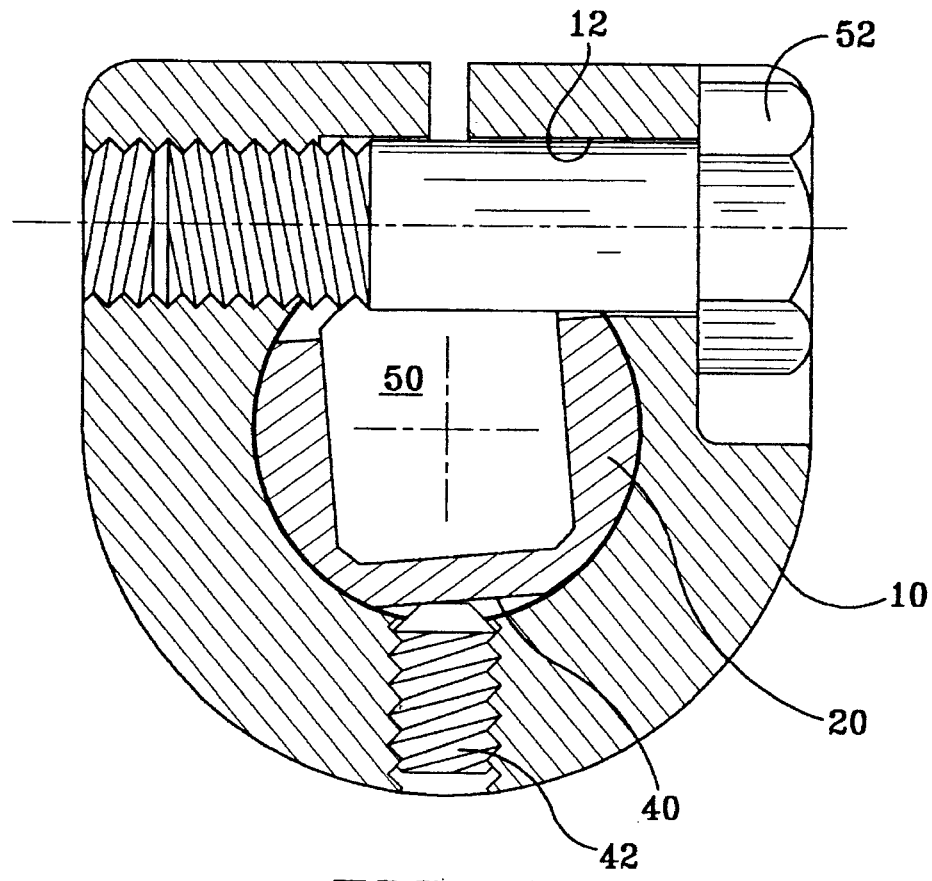
FIG. 6 is cross-section of FIG. 2 taken on line 6—6.

In the preferred embodiment, the insert 20 is secured by a set screw 42 engaging both the flat portion 40 which limits angular movement and the shoulder portion 43 on the insert 20 which prevents axially movement of the insert 20 (See FIGS. 3, 4 and 6). For the insert 20 shown in FIG. 6, the angular movement is limited to ±30 degrees. When the yoke securing bolt 52 is tightened, the yoke member 10 is tightened against both the insert 20, and the shaft 50. This provides additional axial and angular restraint of the insert 20 relative to the yoke member 10. To further improve this restraint, the insert can be provided with knurling 36 on the outer surface of the insert 20.

Figure 7:
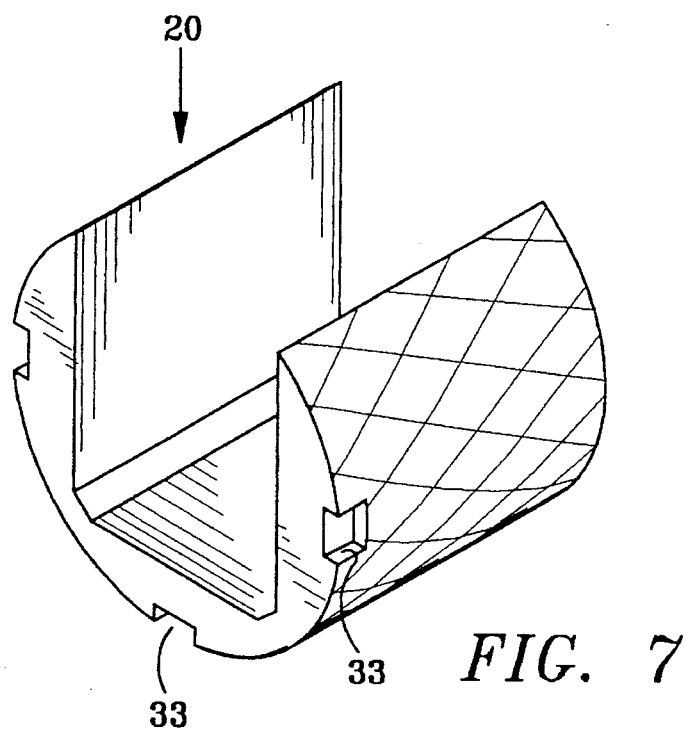
FIG. 7 is a perspective view of another embodiment of an angular adjustable insert.

The insert 20 in FIGS. 7 and 8 has a plurality of retention stop depressions 33 which interengage stakes 32 to limit the angular movement of the insert 20 relative to the yoke member 10. The retention stop depressions 33 shown in FIGS. 7 and 8 limit the angular movement of the insert 20 to ±10 degrees. Stakes 32 also provide axial retention of the insert 20 in the yoke bore 16. The insert 20 shown in FIG. 9 uses stakes 32 to axial retain the insert 20 within the yoke bore 16. The insert 20 in FIG. 9 has an interrupted outer cylindrical shape with two free ends 24. The insert free ends 24 interengage clamp yoke bolt 52 to limit angular movement of the insert 20 within the yoke member 10.

Figure 5:
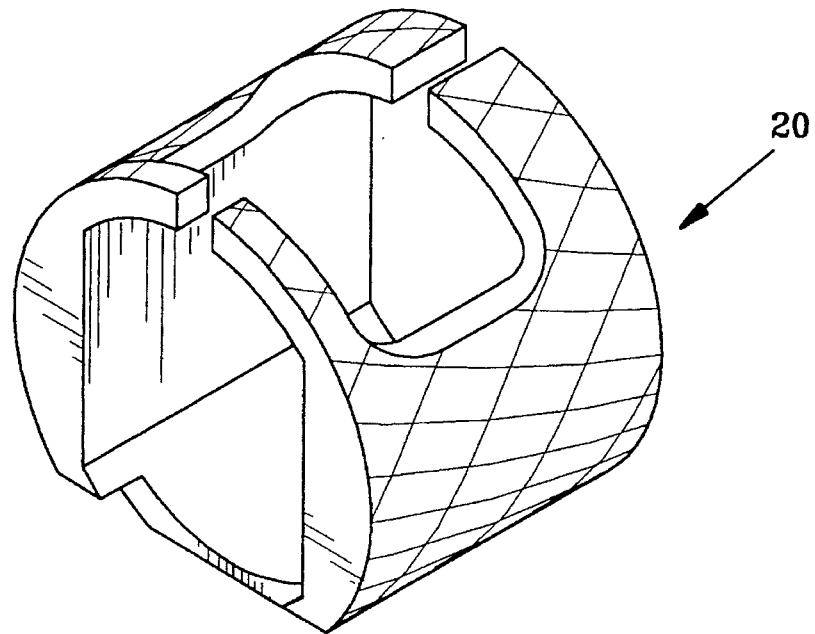
FIG. 5 is a perspective view of another embodiment of the angular adjustable insert.

The insert 20 as shown in FIGS. 1, 3 and 5 has a transversely extending relieved area 38. Relieved area 38 allows bolt 52 to be inserted into the yoke member bolt hole 12 and allows bolt 52 to engage shaft 50. In one embodiment of the angular adjustable clamp yoke, the bolt 52 interengages insert 20 to axially restrain insert 20 and to limit angular movement of insert 20.

In another embodiment of the insert 20, not shown in the drawings, the insert 20 is axially restrained in the yoke member 10 by a snap ring or similar device inserted in the yoke bore 16.

Although the device described above is a clamp yoke, the use of an angular adjustable insert is not limited to clamp yokes. Other steering shafts couplings can be used including hollow tubes, solid shafts with a receiving bore and other similar devices.

Having described the invention, what is claimed is:

1. A coupling comprising:
   a first member, the first member having a first bore therein, the first member being a yoke having a pair of longitudinally extending spaced apart ears;
   an insert member inserted into the first bore, the insert member being angularly adjustable relative to the first member, the insert member having a second bore therein and a cylindrical outer surface with a transversely extending relieved area, the cylindrical outer surface having a flat portion diametrically opposite the transversely extending relieved area and a shoulder portion adjacent the flat portion;
   a second member inserted into the second bore;
   a means for securing the insert member to the first member, the means for securing comprising a restraining member engaging a hole in the first member, the restraining member interengaging the shoulder portion of the insert member to restrain axial movement of the insert member relative to the first member; and
   a means for axially restraining the second member relative to the first member.

2. The coupling according to claim 1, wherein the means for securing the insert member to the first member limits angular movement of the insert member relative to the first member.

3. The coupling according to claim 1, wherein the restraining member interengages the flat portion of the insert member to limit angular movement of the insert member relative to the first member.

4. The coupling according to claim 3 wherein the angular movement of the insert member relative to the first member is limited to +30 degrees.

5. The coupling according to claim 1, wherein the second bore has a profiled interior shape and the second member has a complementary profiled exterior shape.

6. A coupling comprising:
   a first member, the first member having a first bore therein, the first member being a yoke having a pair of longitudinally extending spaced apart ears;
   an insert member inserted into the first bore, the insert member being angularly adjustable relative to the first member, the insert member having a second bore therein and a cylindrical outer surface with a transversely extending relieved area, the cylindrical outer surface having a flat portion diametrically opposite the transversely extending relieved area and a shoulder portion adjacent the flat portion;
   a second member inserted into the second bore;
   a means for axially restraining the insert member relative to the first member, the means for axially restraining comprising a restraining member engaging a hole in the first member, the restraining member interengaging the shoulder portion of the insert member to restrain axial movement of the insert member relative to the first member; and
   a means for limiting angular movement of the insert member relative to the first member.

7. The coupling according to claim 6, wherein the means for limiting angular movement comprises the first bore having a profiled shape and the insert member having a complementary outer profiled shape, there being sufficient differences between the profiled shape of the first bore and the profiled shape of the insert member to permit limited angular movement of the insert member relative to the first member.

8. A clamp yoke comprising:
   a yoke member having a circular aperture therein and a pair of longitudinally extending spaced apart ears;
   a shaft member having a profiled exterior surface;
   an annular insert member having a cylindrical outer surface with a transversely extending relieved area and a profiled interior surface complementary to the shaft member exterior surface; the cylindrical outer surface having a flat portion diametrically opposite the transversely extending relieved area and a shoulder portion adjacent the flat portion, the annular insert member being positioned within the yoke member circular aperture, the annular insert member being angularly adjustable relative to the yoke member, the shaft member being inserted into the annular insert member;
   a means for securing the annular insert member to the yoke member, the means for securing comprising a restraining member engaging a hole in the yoke member, the restraining member interengaging the shoulder portion of the annular insert member to restrain axial movement of the annular insert member relative to the yoke member and whereby angular movement of the annular insert member relative to the yoke member is limited; and a means for axially securing the shaft member to the yoke member.

9. The clamp yoke according to claim 8, wherein the means for securing the annular insert member to the yoke member and the means for axially securing the shaft member to the yoke member comprise a bolt transversely extending through a bolt bore in the yoke member, the bolt engaging the shaft member and the annular insert member.

10. The clamp yoke according to claim 8, wherein the annular insert member cylindrical outer surface is knurled.

11. A clamp yoke for use with a shaft member having a profiled exterior surface, the clamp yoke comprising:

a yoke member having a circular aperture therein;

an annular insert member having a profiled interior surface adapted to be complementary to the shaft member exterior surface and a cylindrical outer surface with a transversely extending relieved area, the cylindrical outer surface having a flat portion opposite the transversely extending relieved area and a shoulder portion adjacent the flat portion; the annular insert member being positioned within the yoke member circular aperture, the annular insert member being angularly adjustable relative to the yoke member;

a means for securing the annular insert member to the yoke member, whereby angular movement of the annular insert member relative to the yoke member is limited and axial movement of the annular insert member relative to the yoke member is restrained, the means for securing the annular insert member comprising a set screw engaging a threaded hole in the yoke member, the set screw engaging the flat portion and the shoulder portion of the annular insert member; and a means for axially securing the shaft member to the yoke member.

* * * * *